(12) United States Patent
Gueu et al.

(10) Patent No.: US 11,126,015 B2
(45) Date of Patent: Sep. 21, 2021

(54) METHOD FOR DETERMINING A PARAMETER OF AN OPTICAL EQUIPMENT

(71) Applicant: Essilor International, Charenton-le-Pont (FR)

(72) Inventors: Stephane Gueu, Charenton-le-Pont (FR); Jean Carrier, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 33 days.

(21) Appl. No.: 16/684,259

(22) Filed: Nov. 14, 2019

(65) Prior Publication Data

US 2020/0081274 A1 Mar. 12, 2020

Related U.S. Application Data

(63) Continuation of application No. 15/750,025, filed as application No. PCT/EP2016/068617 on Aug. 4, 2016, now Pat. No. 10,481,418.

(30) Foreign Application Priority Data

Aug. 5, 2015 (EP) .................................... 15306267

(51) Int. Cl.
*G02C 13/00* (2006.01)
*G01M 11/02* (2006.01)

(52) U.S. Cl.
CPC ....... *G02C 13/003* (2013.01); *G01M 11/0207* (2013.01); *G01M 11/0214* (2013.01); *G01M 11/0228* (2013.01); *G01M 11/0264* (2013.01)

(58) Field of Classification Search
CPC ............ G02C 13/003; G01M 11/0207; G01M 11/0214; G01M 11/0228; G01M 11/0264

(Continued)

(56) References Cited

U.S. PATENT DOCUMENTS 4,549,081 A 10/1985 Ace
5,303,022 A 4/1994 Humphrey
(Continued)

FOREIGN PATENT DOCUMENTS

DE 91 06 221 U1 7/1992
EP 0 822 440 A1 2/1998
(Continued)

OTHER PUBLICATIONS

International Search Report dated Nov. 18, 2016 in PCT/EP2016/068617, 3 pages.

(Continued)

*Primary Examiner* — Roy M Punnoose
(74) *Attorney, Agent, or Firm* — Oblon, McClelland, Maier & Neustadt, L.L.P.

(57) ABSTRACT

A method for determining a parameter of an optical equipment including an optical equipment positioning step, during which an optical equipment comprising a pair of optical lenses mounted on a spectacle frame is positioned in a first position, a portable electronic device positioning step, during which a portable electronic device comprising an image acquisition module is positioned in a second position determined and/or known relatively to the first position so as to acquire an image of a distant element seen through at least part of the optical lenses of the optical equipment in the first position, a parameter determining step, during which at least one optical parameter of the optical equipment is determined based on the image of a distant element seen through at least part of the optical lenses of the optical equipment in the first position.

16 Claims, 7 Drawing Sheets

(58) Field of Classification Search
USPC .......................................................... 356/127
See application file for complete search history.

(56) References Cited

U.S. PATENT DOCUMENTS

| | | | |
|---|---|---|---|
| 5,657,116 A | 8/1997 | Kohayakawa | |
| 5,855,074 A | 1/1999 | Abitbol | |
| 5,973,772 A | 10/1999 | Fukuma et al. | |
| 6,072,570 A | 6/2000 | Chipman | |
| 6,091,546 A | 7/2000 | Spitzer | |
| 6,963,399 B2* | 11/2005 | Cargill | G01N 21/31 356/300 |
| 7,280,191 B2* | 10/2007 | Yanagi | G01M 11/0207 356/124 |
| 7,508,502 B2* | 3/2009 | Divo | G02C 13/005 356/124 |
| 7,538,863 B2* | 5/2009 | Divo | G02C 13/005 356/127 |
| 8,690,324 B2 | 4/2014 | Dubois | |
| 9,000,390 B2 | 4/2015 | Citek | |
| 2002/0113940 A1* | 8/2002 | Fukuma | G01M 11/0207 351/200 |
| 2003/0095256 A1* | 5/2003 | Cargill | G01N 21/31 356/328 |
| 2006/0152709 A1 | 7/2006 | Imaizumi | |
| 2007/0115353 A1 | 5/2007 | Divo et al. | |
| 2007/0121100 A1* | 5/2007 | Divo | G02C 13/005 356/124 |
| 2010/0293069 A1 | 11/2010 | Freson | |
| 2014/0222526 A1 | 8/2014 | Shakil | |
| 2015/0248020 A1 | 9/2015 | Fayolle | |
| 2015/0300912 A1* | 10/2015 | Allione | G01M 11/0285 356/124.5 |
| 2016/0343539 A1 | 11/2016 | Waisman | |
| 2019/0072455 A1* | 3/2019 | Limon | G06K 9/00624 |

FOREIGN PATENT DOCUMENTS

| | | |
|---|---|---|
| EP | 1 679 499 A2 | 7/2006 |
| EP | 1 692 563 | 8/2006 |
| FR | 3 000 233 A1 | 6/2014 |
| WO | WO 2005/066692 A2 | 7/2005 |

OTHER PUBLICATIONS

"EyeNetra—Eye Care for 2.4 Billion People in Need", Retrieved from the internet: https://web.archive.org/web/20150620025256/http://eyenetra.com/product-netrometer.html , Jun. 20, 2015, XP55253293, 5 Pages.

"Experience Wearables and More at VM's Eye2 Zone at Expo", Retrieved from the internet: https://web.archive.org/web/20150318234714/http://www.visionmonday.com/technology/article/experience-wearables-and-more-at-vm-s-eye2-zone-at-expo , Mar. 18, 2015, XP055253583, 4 pages.

"Eyenetra—Netra and Netrometer", Retrieved from the internet: https://ww.youtube.com/watch?v=yFE7s1OysR4 , Mar. 19, 2015, XP054978395, 5 pages.

* cited by examiner

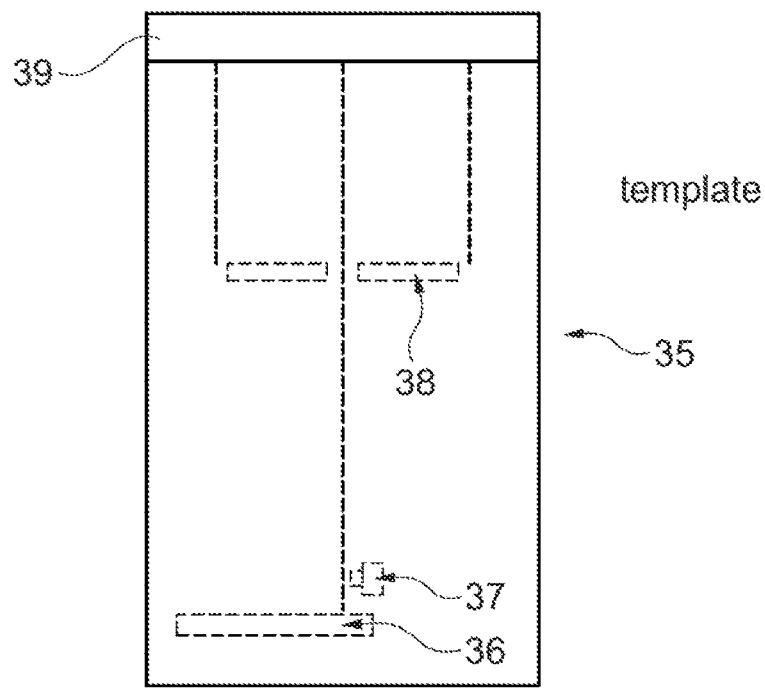
Fig. 5
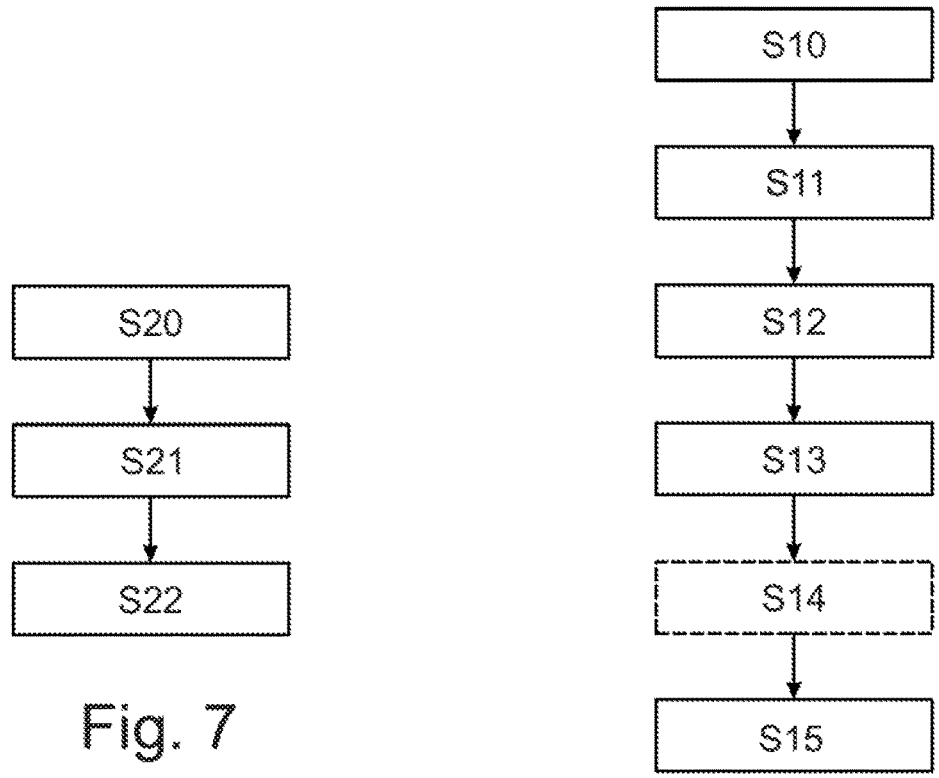
Fig. 7
Fig. 6

METHOD FOR DETERMINING A PARAMETER OF AN OPTICAL EQUIPMENT

CROSS-REFERENCE TO RELATED APPLICATIONS

This application is a continuation application of, and claims the benefit of priority under 35 U.S.C. § 120 from, U.S. application Ser. No. 15/750,025, filed Feb. 2, 2018, herein incorporated by reference, which is a National Stage Application of International Application No. PCT/EP2016/068617, filed Aug. 4, 2016.

FIELD OF THE INVENTION

The invention relates to a method for determining a parameter of an optical equipment, a device for determining at least one parameter of an optical equipment, a method for ordering a new optical equipment and a method for providing a new optical equipment to a person.

BACKGROUND OF THE INVENTION

Usually, a person wishing to have an optical equipment goes to see an eye care practitioner.

The eye care practitioner orders the eyewear equipment at an optical lab by sending an order request to the optical lab. The order request may comprise wearer data, for example the wearer's prescription, fitting data, spectacle frame data, for example the type of spectacle frame the wearer has selected, and lens data, for example the type of optical lens the wearer has selected.

The determination of the wearer's prescription and fitting data may require carrying out complex and time consuming measurements. Such measurements usually require complex and costing material and qualified personnel to be carried out.

Such measurements are usually carried out even when the person's optical needs have not changed. For example, a person that wants to order a new frame with the same optical lenses than with his/her previous spectacles may have to go through the tedious process indicated previously.

The eye care practitioner may use lens mapper and/or lens meter to determine the optical features of the current optical lenses of the optical equipment of the person. However, such devices still require going to the eye care practitioner since there are very expensive and require qualified person to be used. In other words, the person himself may not use such devices to determine the parameters to be included in the order request. Typically, such devices are not available when a person wishes to order a new optical equipment over the internet.

Therefore, there is a need to a method and a device that would allow a person to quickly, easily and at low cost determined optical parameters of his/her current optical equipment.

One object of the present invention is to provide such method.

SUMMARY OF THE INVENTION

To this end, the invention proposes a method for determining a parameter of an optical equipment, the method comprising:
an optical equipment positioning step, during which an optical equipment comprising a pair of optical lenses mounted on a spectacle frame is positioned in a first position,
a portable electronic device positioning step, during which a portable electronic device comprising an image acquisition module is positioned in a second position determined and/or known relatively to the first position so as to acquire an image of a distant element seen through at least part of the optical lenses of the optical equipment in the first position,
a parameter determining step, during which at least one optical parameter of the optical equipment is determined based on the image of a distant element seen through at least part of the optical lenses of the optical equipment in the first position.

Advantageously, the method of the invention allows a person to determine optical parameters of his/her current optical equipment by simply using a portable electronic device, such as a smartphone, a tablet computer or a laptop.

According to further embodiments which can be considered alone or in combination:
the method further comprises a pattern positioning step during which a pattern is positioned in a third position relative to the optical equipment so as to allow the portable electronic device in the second position to acquire an image of the pattern seen through at least part of the optical lenses of the optical equipment in the first position; and/or
the third position is determined and/or known relatively to the first and/or second position; and/or
the optical parameter is determined by comparing the pattern with the image of the pattern seen through at least part of the optical lenses of the optical equipment in the first position; and/or
the method further comprises a position determining step during which the distance and the relative orientation of the image acquisition module of the portable electronic device and the optical equipment are determined; and/or
the distance and relative orientation of the image acquisition module of the portable electronic device and the optical equipment are determined using at least measuring means of the portable electronic device; and/or
the distance and relative orientation of the image acquisition module of the portable electronic device and the optical equipment are determined using at least measuring means including a printed sheet having specific printed features; and/or
the distance and relative orientation of the image acquisition module of the portable electronic device and the optical equipment are determined using a known size element positioned at the second and/or third positions; and/or
the optical parameter of the optical equipment comprises parameters selected in the list consisting of:
the optical power in a visual reference zone of the optical lenses,
the optical cylinder in a visual reference zone of the optical lenses,
the optical cylinder axis in a visual reference zone of the optical lenses,
the optical prism in a visual reference zone of the optical lenses,
the type of optical design of the optical lenses; and/or
the method further comprising:
a fitting parameter determining step during which at least one fitting parameter of the optical lenses in the spectacle frame is determined based on an image of the spectacle frame acquired by the portable electronic device and the image of a distant element seen through at least part of the optical lenses of the optical equipment in the first position, wherein the fitting parameter is determined based on the position of a reference point of the optical lenses relative to the spectacle frame.

The invention also relates to a device for determining at least a parameter of an optical equipment comprising a pair of optical lenses mounted on a spectacle frame, the device comprising:

a receiving element configured to physically receive the optical equipment in at least a first predetermined position, an acquisition receiving element configured to physically receive a portable electronic device having an image acquisition module in at least a second predetermined position relative to the optical equipment received by the receiving element so as to acquire an image of a distant element seen through at least part of the optical lenses of the optical equipment received by the receiving element.

According to further embodiments which can be considered alone or in combination:

the device further comprises at least one predetermined pattern to be used as said distant element; and/or the predetermined pattern is in at least a third predetermined position relative to the first and second predetermined positions; and/or the device further comprises means for determining the position of the distant element relative to the first and/or second predetermined positions; and/or the device further comprises a light reflecting element configured to reflect a pattern displayed on a screen of the portable electronic device so as to provide a distant element to be acquired by the portable electronic device through at least part of the optical lenses of the optical equipment received by the receiving element; and/or the device further comprises a light reflecting element configured to reflect a pattern displayed on a screen of the portable electronic device so as to provide a distant element to be acquired by the portable electronic device through at least part of the optical lenses of the optical equipment received by the receiving element, wherein the device is configured so that the portable electronic device acquires an image of the pattern deformed twice by the optical equipment, and the portable electronic device is selected in the list consisting of a smartphone, a personal digital assistant and a tablet computer.

The invention further relates a method for ordering a new optical equipment for a user of a first optical equipment, the method comprising:

an optical equipment positioning step, during which the first optical equipment comprising a first pair of optical lenses mounted on a first spectacle frame is positioned in a first position, a portable electronic device positioning step, during which a portable electronic device comprising an image acquisition module is positioned in a second position so as to acquire an image of a distant element seen through at least part of the optical lenses of the first optical equipment in the first position, an acquisition step during which at least one image of the distant element seen through at least part of the optical lenses of the first optical equipment is acquired, a position adjustment step during which the relative position of the portable electronic device and the first optical equipment is adjusted based on an identification of at least part of the optical equipment and/or the portable electronic device, an ordering step during which an order request for a new optical equipment is sent to a distant entity, the order request comprising the at least one image acquired by the portable electronic device and new optical equipment identification data.

The method may further comprise a parameter determining step, during which at least one optical parameter of the optical equipment is determined based on the image of a distant element seen through at least part of the optical lenses of the optical equipment in the first position.

The method of the invention may further comprise a device providing step during which a device according to the invention is provided to position the first optical equipment and a portable electronic device.

The invention also relates to a method for providing optical equipment for a person, the method comprising:

an order receiving step during which an order request generated by a method according to the invention and comprising at least an image of a predetermined element seen through at least part of the optical lenses of the first optical equipment of the person is received, a parameter determining step during which at least one optical parameter of the optical equipment is determined based on the at least one received image, an optical equipment providing step during which a new optical equipment is provided to the person based on the at least one optical parameter determined during the parameter determining step.

The invention further relates to a computer program product comprising one or more stored sequences of instructions that are accessible to a processor and which, when executed by the processor, causes the processor to carry out at least the steps of the method according to the invention.

The invention also relates to a computer-readable storage medium having a program recorded thereon; where the program makes the computer execute at least the steps of the method of the invention.

The invention further relates to a device comprising a processor adapted to store one or more sequence of instructions and to carry out at least steps of the method according to the invention.

BRIEF DESCRIPTION OF THE DRAWINGS

Embodiments of the invention will now be described, by way of example only, and with reference to the following drawings in which:

FIG. 5 is an example of template according to the invention, FIG. 6 is a flow chart representing an ordering method according to the invention, FIG. 7 is a flow chart representing an ordering method according to the invention.

DETAILED DESCRIPTION OF PREFERRED EMBODIMENTS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Figure 1:
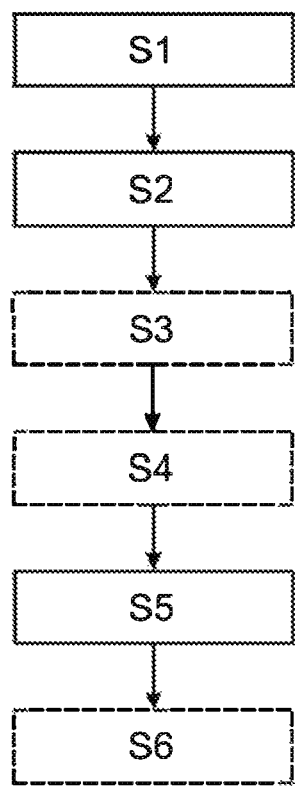
FIG. 1 is a flow chart representing a method for determining a parameter of an optical equipment according to the invention.

As illustrated on FIG. 1, the method for determining a parameter of an optical equipment according to the invention comprises at least an optical equipment positioning step S1, a portable electronic device positioning step S2, and a parameter determining step S5.

During the optical equipment positioning step S1, an optical equipment 10 comprising at least a pair of optical lenses 12 mounted on a spectacle frame is positioned in a first position.

During the portable electronic device positioning step S2, a portable electronic device 20 comprising at least an image acquisition module, for example a camera 22, is positioned in a second position. The second position may be determined and/or known relatively to the first position in which the optical equipment 10 is positioned during step S1.

The optical equipment 10 and the portable electronic device 20 are positioned so as to allow acquiring by the image acquisition module of the portable electronic device 20, an image of a distant element seen through at least part of the optical lenses 12 of the optical equipment 10 in the first position.

According to some embodiment of the invention a specific zone of the optical lenses 12 may be of interest, such as the optical center for a single vision lens, or the far and/or near vision zone for a multifocal lens. In such case an image of the distant element seen through such specific zones of the optical lenses 12 may be sufficient to determine optical parameters of the optical lenses 12.

In a preferred embodiment, the optical equipment 10 and the portable electronic device 20 are positioned so as to allow acquiring an image of a distant element seen through all of the optical lenses 12 of the optical equipment 10 in the first position. Advantageously, having an image over all the surface of each optical lenses 12 provide more accurate and precise determination of the optical parameters of the optical lenses 12 of the optical equipment 10.

Figure 2:
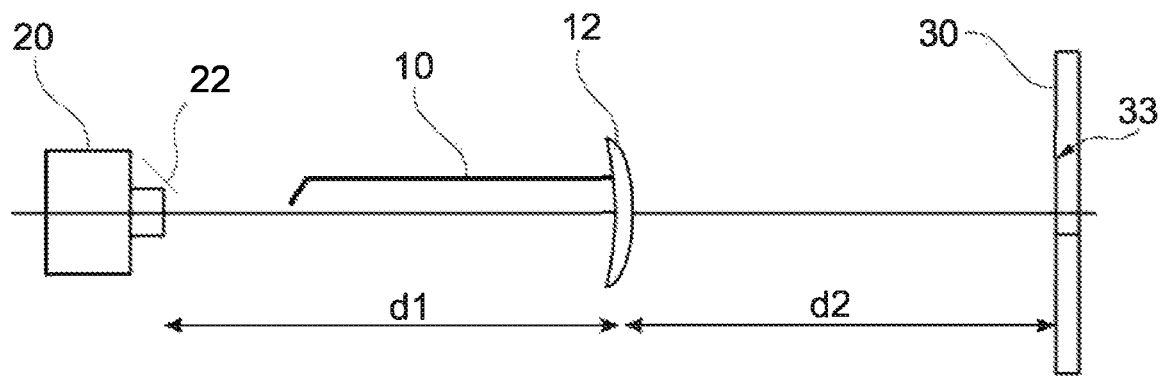
FIG. 2 illustrates the positioning a portable electronic device, an optical equipment and a pattern according to a method of the invention.

FIG. 2 illustrates an example in which a pair of spectacles is positioned between a camera 22 of a portable electronic device 20 at a distance d1 and a screen 30 at a distance d.

As illustrated in FIG. 2, the pair of spectacles and the camera 22 are positioned so that an image of at least part of the screen 30 seen through at least part of the optical lenses 12 of the pair of spectacles can be acquired by the camera 22.

In the sense of the invention, the portable electronic device 20 is any portable electronic device comprising an image acquisition module, such as a camera, CMOS or CDD. For example, the portable electronic device 20 may be a smartphone, a personal digital assistant, or a tablet computer.

The portable electronic device 20 preferably comprises a memory to store executable computer programs and data and a processor to execute the stored computer program. The portable electronic device 20 may further comprise a communication unit to allow the portable electronic device 20 to communicate data with distant device. The communication unit may be configured either for a wire connection or a wireless connection using for example WIFI or Bluetooth® technology.

The wire connection may also by a USB type. The portable electronic device 20 may comprise a memory storing data and the data may be communicated to distant entity using a cable connection.

In order to achieve accurate measurements, it is recommended that during the optical equipment positioning step the frame is not positioned in any manner relative to the image acquisition module. Indeed, poor positioning of the frame may result in significant errors in the measurement of optical parameters of the optical lenses.

Figure 3:
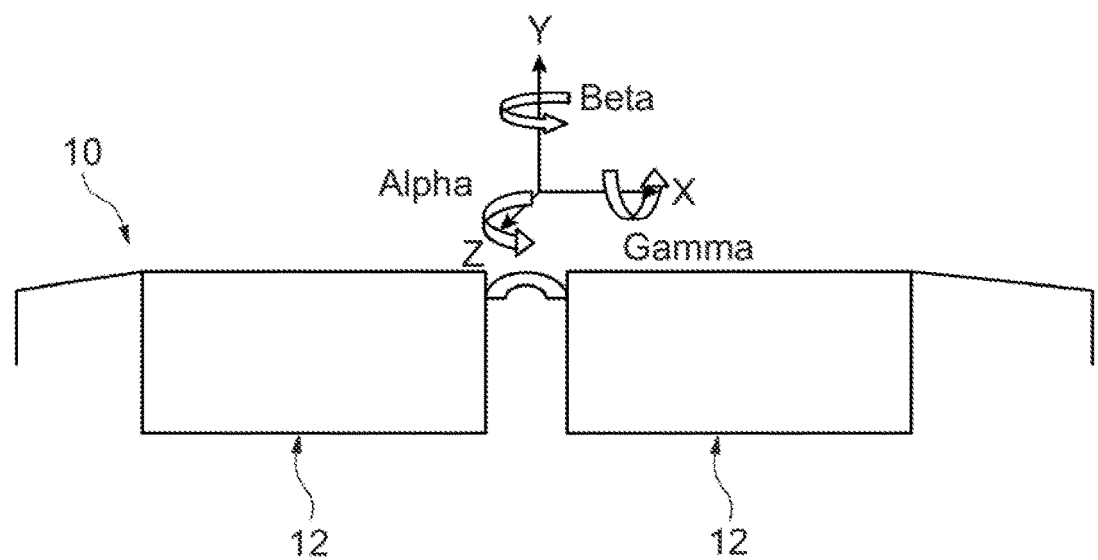
FIG. 3 illustrates the orientation of a spectacle frame.

For example, it is desirable that:

the frame is placed horizontally, adjusting angle Alpha as represented on FIG. 3, the branches of the spectacle frame are parallel to the optical axis of the acquisition module in an horizontal plane, adjusting angle Beta as represented on FIG. 3, the branches of the spectacle frame are parallel to the optical axis of the acquisition module in a vertical plane, or a slight angle of about 10° to compensate the pantoscopic angle, adjusting the angle Gamma as represented on FIG. 3.

To assure a correct position of the optical equipment 10, the portable electronic device 20 may comprise a position help module that provides a feedback to the user on how to position the optical equipment 10. This is particularly useful when the user needs to hand both the optical equipment 10 and the electronic device, because positioning may be more difficult for the user.

The positioning of the frame (Beta, Gamma) can be achieved via a visual aid on a screen, for example the screen of the portable electronic device 20 to ensure an accurate measurement.

For example, the frame is shot, and the portable electronic device 20 comprises an image processing unit or communicates data with a distant entity comprising the image processing unit. The image processing unit is capable of checking that angle Beta is close to 0 by checking the symmetry of right sides/left of the frame.

If the symmetry is poor, it is indicated on the screen how to orient the mount to correct this.

In a similar manner, it can be checked by image processing that the sides of the frame are parallel to the optical axis of the acquisition module: the image of the branches should in this case be contained on a horizontal line.

The angle alpha of the frame can be determined by image processing, allowing by rotating the image by image processing repositioning the frame so as to have the angle alpha close to 0.

The distant element 33 whose image through at least part of the optical lenses 12 is to be acquired using the portable electronic device 20 may be a pattern 34 such as square grid, equally spaced dots, letters from a book or a newspaper, symbols etc. . . . positioned at a given distance of the optical equipment 10 or an element far enough to be considered at infinity.

For example, the distant element 33 may be an element of the environment (tree, building, wallpaper, printed book . . . ). In this case the distant element 33 is preferably immobile, with sufficient contrast, to get most accurate measurements.

In this respect the portable electronic device 20 may comprise a distant element quality indicator which authorize or not the measure according to the characteristics of distant element seen through the optical lenses 12, for example element contrast indicator and/or number of elements. Preferably, the distant element 33 is located at a distance greater than 4 m so as to be considered at infinity.

As illustrated in FIG. 1, the method of the invention may comprise a pattern positioning step S3.

During the pattern positioning step S3, a pattern 34 is positioned in a third position relative to the optical equipment 10 so as to allow the portable electronic device 20 in the second position to acquire an image of the pattern 34 seen through at least part of the optical lenses 12 of the optical equipment 10 in the first position.

Preferably, the third position is determined and/or known relatively to the first and/or second position.

The pattern 34 can be displayed on a screen 30 for example a computer monitor or a smart phone. The pattern 34 may also be a printed pattern on a standard sheet of paper, or text printed on a piece of paper.

Figure 8:
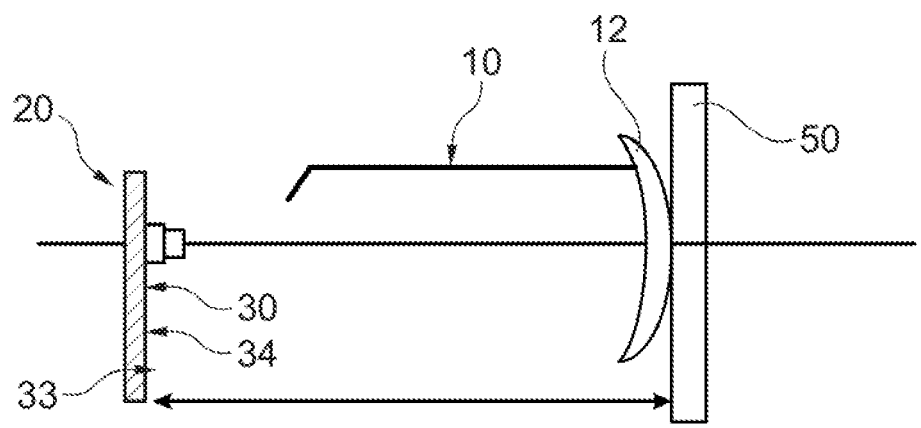
FIGS. 8 and 9 illustrate examples of devices according to the invention.

The display of the pattern 34 and the acquisition of the images can be performed by only one device (for example, a smartphone or a laptop) by using a mirror 50 as illustrated on FIG. 8.

The pattern 34 may be a dot matrix, colored or uncolored, a grid. The pattern may be movable to cover a greater portion of the optical lenses.

Preferably, the features of the pattern 34 have a width of at least three times the resolution of the acquisition module in order to have an accurate measurement of the position of the different features.

The physical size of the pattern 34 need to be known, and this size can be known from a size value input from the user, from a measurement using a photo of both the pattern 34 and an known size element, such as a credit card, or from normalized value of the pattern, for example the normalized size of a sheet of paper having 5 mm square grid used as a pattern.

The method of the invention may further comprise a position determining step S4. During the position determining step S4, the distance and the relative orientation of the image acquisition module of the portable electronic device 20 and the optical equipment 10 are determined.

According to an embodiment of the invention, the distance and relative orientation of the image acquisition module of the portable electronic device 20 and the optical equipment 10 are determined using at least measuring means of the portable electronic device 20.

Indeed, the portable electronic may be equipped with measuring means such a stereo or 3D camera, telemeter that may be used to determine the distance and orientation of the optical equipment and/or the distant element.

According to an embodiment of the invention, the distance and relative orientation of the image acquisition module of the portable electronic device 20 and the optical equipment 10 are determined using at least measuring means including a printed sheet having specific printed features.

Typically, the distant element 33 is a pattern 34 of known dimension, such as a standard sheet having a standard dimension grid printed.

According to an embodiment of the invention, the distance and relative orientation of the image acquisition module of the portable electronic device 20 and the optical equipment 10 are determined using a known size element positioned at the second and third positions. For example, a credit card or a known coin may be positioned next to the optical equipment 10 and the distant element 33 to provide a reference element used to determine the distances and relative orientations.

During the parameter determining step S5, at least one optical parameter of the optical equipment 10 is determined. The optical parameter is determined based on the image of a distant element 33 seen through at least part of the optical lenses 12 of the optical equipment 10 in the first position.

The optical parameter may be determined using a processor included in the portable electronic device 20 or in a distant entity communicating with the portable electronic device 20 via communication means.

For example, the optical parameter is determined by comparing the pattern 34 with the image of the pattern seen through at least part of the optical lenses 12 of the optical equipment 10 in the first position. The pattern 34 compared to the image of the pattern seen through the optical lenses, may either be an image of the pattern taken by the acquisition module without the optical equipment 10, or the image of the pattern that appears around the optical equipment 10 or corresponds to a known pattern.

The optical parameter may be determining by analyzing the characteristic of the pattern seen through the optical lenses 12.

For example if one uses a dot matrix, the characteristic size may be the distance between 2 points, if a grid is used, the characteristic size may be the size of a square or the characteristic of the pattern may be the positions of the 4 corners, etc. . . . .

This size is measured (in pixels) by analysis of the image at sub-pixel resolutions.

For example, in the case of a dot matrix, it is determined the center of gravity of each dot matrix at resolutions of $\frac{1}{100}$ pixels.

One then obtains T1 (x, y) the size feature of the lens at a point (x, y) of the optical lens.

The size feature of the pattern T0 (x, y) may be measured in the absence of the optical equipment 10, for example by removing the optical equipment 10, or by measuring the size feature around the optical lenses 12 or by simply knowing the size feature of the pattern 34.

One may determine the magnification G (x, y)=T1 (x, y)/T0 (x, y) of the optical lenses. This magnification G may differ versus orientation, for example G may be different for horizontal axis and vertical axis when cylindrical power exist. The following example are given for lenses having no cylindrical power, but one can easily generalize this to lenses having cylinder by application to the following formula to different orientation.

The optical parameter of the optical equipment 10 comprises parameters selected in the list consisting of:
 the optical power in a visual reference zone of the optical lenses 12,
 the optical cylinder in a visual reference zone of the optical lenses 12,
 the optical cylinder axis in a visual reference zone of the optical lenses 12, the prism in a visual reference zone of the optical lenses 12, the type of optical design of the optical lenses 12, such as the distribution of optical power on the surface of the optical lens.

The optical power in a visual reference zone of the optical lens may be determining from the magnification G (x, y), and distance d1 between the optical equipment 10 and the acquisition module and distance d2 between the optical equipment 10 and the distant element 33, for example the pattern 34.

For example, $S(x,y)=(1-1/G(x,y))*(d1+d2)/(d1*d2)$ with S the value of the spherical power, this value can be determined locally, it is possible to check if the optical lenses 12 are single vision (G (x, y) constant) or multifocal lenses.

Alternatively, it is also possible to determine the optical lens power by ray tracing. In this case, it is determined by optimization the optical lens generates the same strain as observed by the camera 22.

It is also possible to determine the optical center of the lens, or more generally the points of zero horizontal prismatic deviation.

Knowledge of these reference points makes it possible to determine how the lenses are centered in relation to the frame (these points should correspond to an alignment with the pupils of the eyes), and may allow controlling lens centered in the same manner as existing equipment.

For example, in addition or instead of determining the magnification of the pattern 34 but their movement, and in particular one determined points of the optical lens for which the horizontal displacements are zero.

For example, in the case of a pattern 34 made up of a grid of points, one may determine the displacement of each point with/without the optical equipment 10, and that it is determined for which the horizontal movement is zero (possibly by interpolation).

The method of the invention may further comprise a dimension determining step S0 during which at least one dimension of the optical equipment 10 is determined.

An example of implementation of the dimension determining step S0 may be described with reference to FIG. 10.

Figure 10:
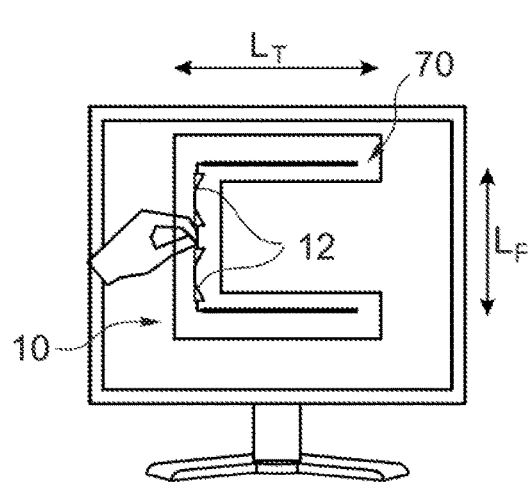
FIG. 10 illustrates an implementation of a dimension determining step of the invention.

In the example of FIG. 10, the optical equipment 10 is a spectacle frame comprising optical lenses 12 and the dimensions to be determined are the temple length $L_T$ and the frame width $L_F$.

The dimension determining step may comprise putting the spectacle frame on a pattern 70 whose dimensions are known, for example a calibrated screen or paper whose format is known or paper with elements of known size. A photo of the spectacle frame using a portable electronic device 20 may then be taken and then image processing done to automatically determine the temple length $L_T$ and the frame width $L_F$.

The pattern 70 used may advantageously be design to provide a high contrast level between the pattern 70 and the optical equipment 10 so as to facilitate image processing.

In case of the use of a laptop screen, the user may need to put an object 60 whose dimensions are known, for example a credit card or a smartphone on the screen.

Figure 11:
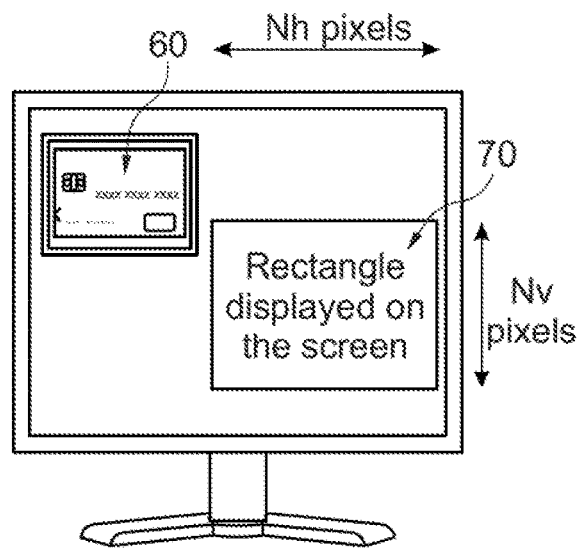
FIG. 11 illustrates an example of a calibration of a laptop screen.

As illustrated on FIG. 11, a rectangle whose size is known in pixels is displayed on the screen. By taking a picture of the screen and the object of known dimension 60, such as the card or by adjusting the size of the rectangle to the size of the card, it is possible to have the relation between a pixel and 1 mm (pixel size). The pixel size being known, the pattern 70 size is thus also known.

Figure 12A:
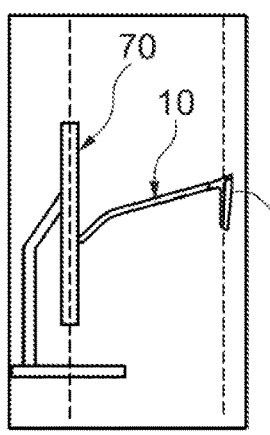
FIGS. 12A and 12B illustrate an implementation of an optical equipment positioning step of the invention, FIGS. 13 A and 13 B illustrate an implementation of a portable electronic device positioning step of the invention.

During the optical equipment positioning step S1, the optical equipment 10 may be positioned relative to a pattern 70 by putting the extremity of the optical equipment 10, for example the frame temple, in contact with the pattern 70 displayed on a screen or printed-out on a paper for example. Such positioning is illustrated on FIGS. 12A and 12B.

Figure 12B:
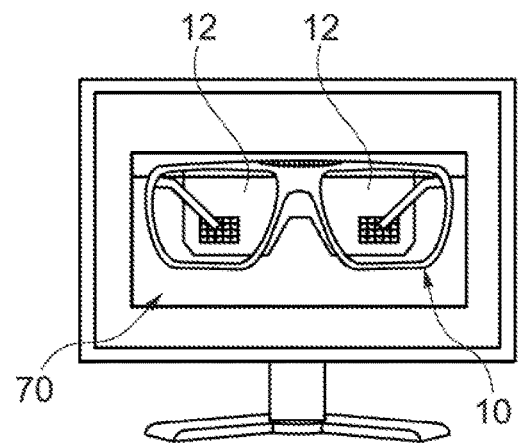

During this step, the position and orientation of the optical equipment 10 can be defined by using patterns 70 and indications on the pattern support as indicated in FIG. 12B. This enables to help the user to center and tilt the optical equipment 10 as required.

In the example of FIG. 12B, two patterns 70 right and left small rectangles are used to position the end of the temple of the frame, while a big size rectangle is used to position the frame shape for orientation.

During the portable device positioning step S2, the portable electronic device 20 may be positioned using the pattern 70 described previously picture and having the user
setup the distance d2 between the device 20 and the pattern 70 so that the spectacle frame is seen completely into the big size rectangle, and
setup the orientation of the frame so that the big rectangle is seen by the camera 22 of the portable electronic device 20 with four right angles.

Figure 13A:
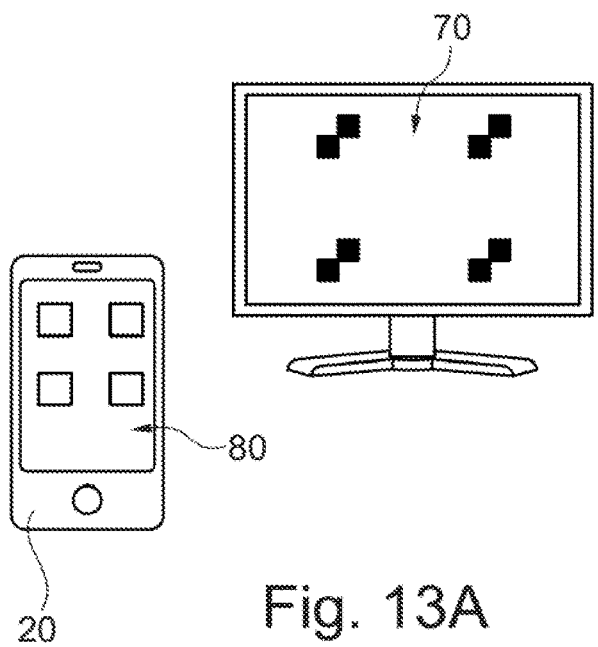
Figure 13B:
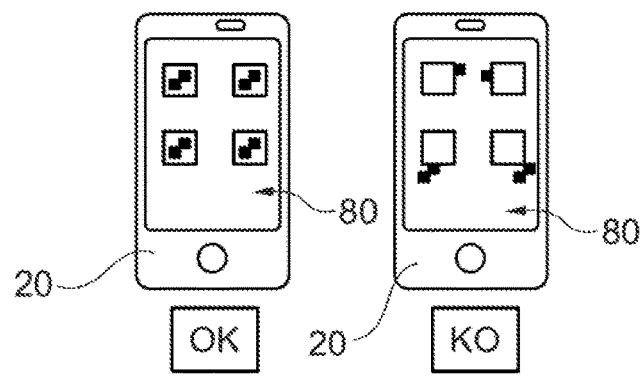

Alternatively, during the portable electronic device positioning step S2, the portable electronic device 20 may be positioned using a layout 80 illustrated on FIG. 13 with four squares available on the portable electronic device screen and having the user superpose the squares with four squares available on the pattern support.

Advantageously, with this solution it is possible to automate the image taking step if the function is implementation through a native application for example.

Figure 14:
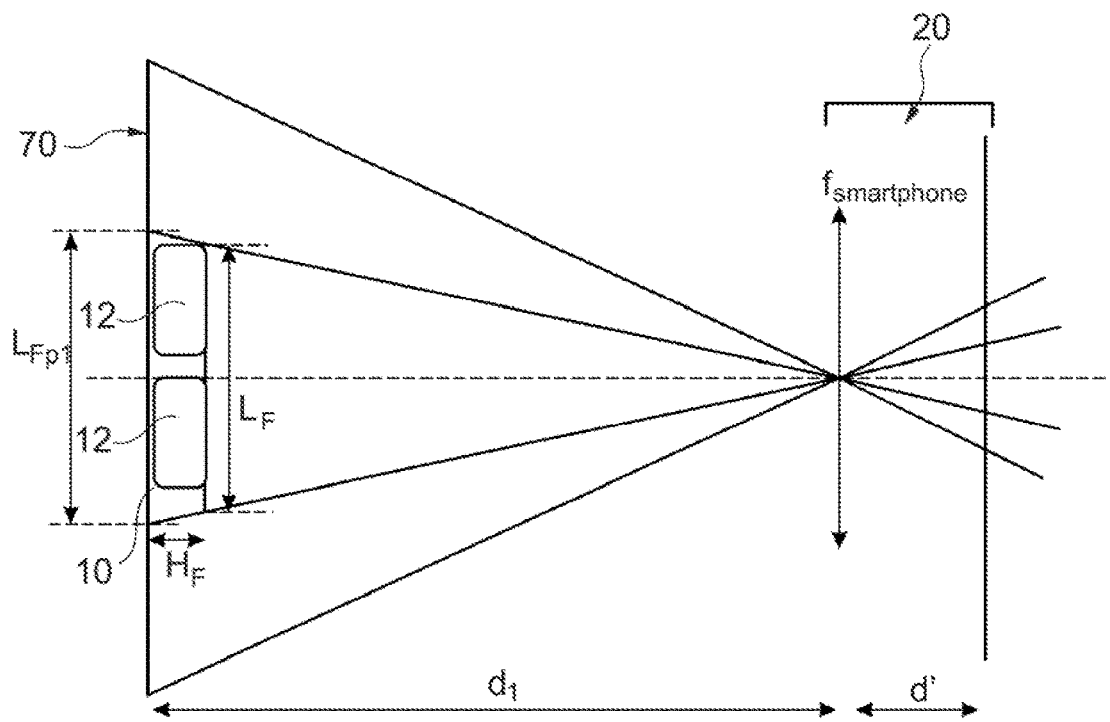
FIGS. 14 to 15 illustrate a perspective effect.

As illustrated on FIG. 14, using the image taken during the parameter determining step S5 and the geometrical dimensions determined during the geometrical dimension step S0, it is possible to determine the distance position between the electronic device 20 and the optical equipment 10 using perspective effect having:

$$\frac{L_{F2}}{d2} = \frac{L_F}{d2-L_T}$$

Figure 15:
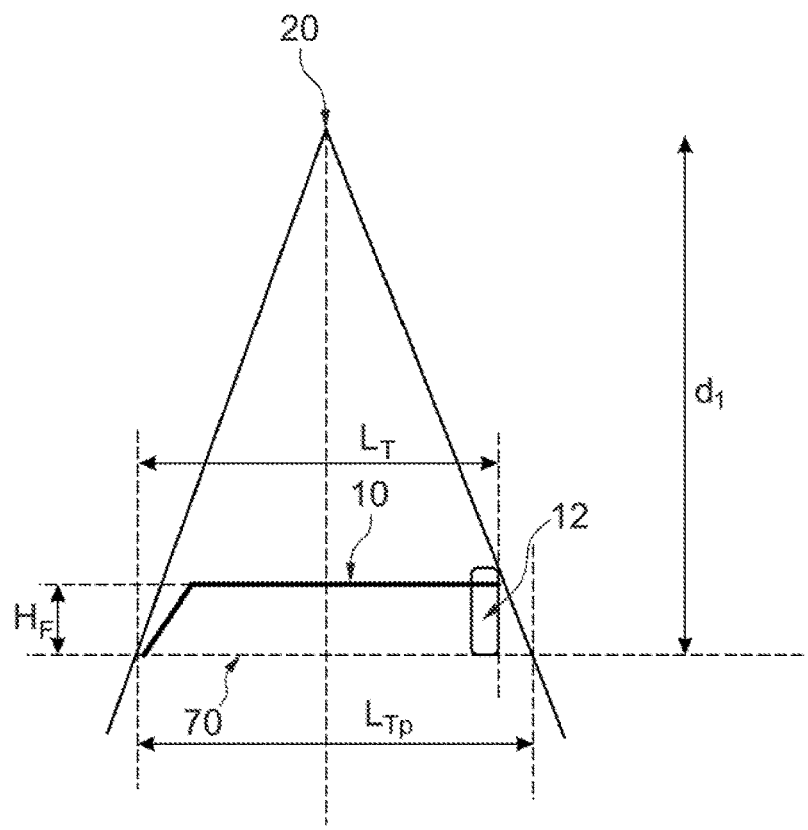

It is possible to improve the dimension determining step performance in order to correct some not negligible perspective effects during the dimension determining step S0. Indeed, as illustrated on FIG. 15, the frame is not perfectly in the same plane as the pattern 70, due to frame height $H_F$.

Figure 16:
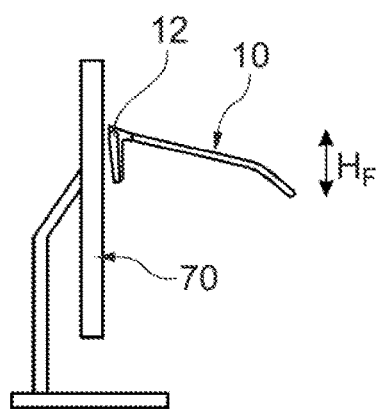
FIGS. 16 and 17 illustrate a method for compensating the perspective effect.

Correction of the perspective effects may be done by taking an additional picture of the optical equipment 10 with the lens in contact with the pattern support used in the dimension determining step S0, as illustrated on FIG. 16.

Figure 17:
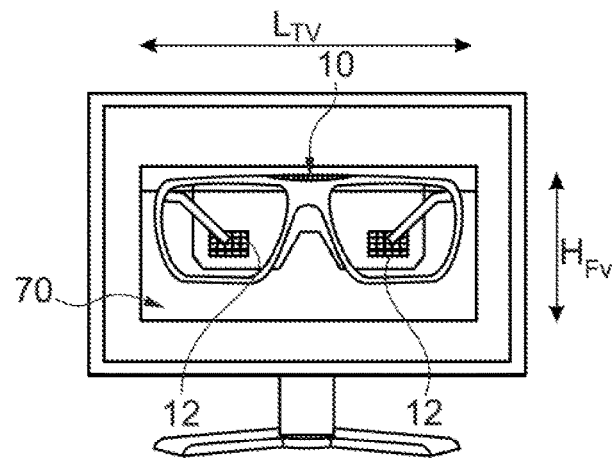

Correction of the perspective effects may further comprise using images taken during steps S0 and S5 and implementing an iterative calculation taking into account the ratio $L_F/H_F=L_{FV}/H_{FV}$ measured on the picture from the step S5 and illustrated on FIG. 17.

As illustrated on FIG. 1, the method of the invention may further comprise a fitting parameter determining step S6.

During which at least one fitting parameter of the optical lenses 12 in the spectacle frame is determined based on an image of the spectacle frame acquired by the portable electronic device 20 and the image of a distant element 33 seen through at least part of the optical lenses 12 of the optical equipment 10 in the first position.

Typically, the fitting parameter is determined based on the position of a reference point of the optical lenses relative to the spectacle frame.

Figure 4:
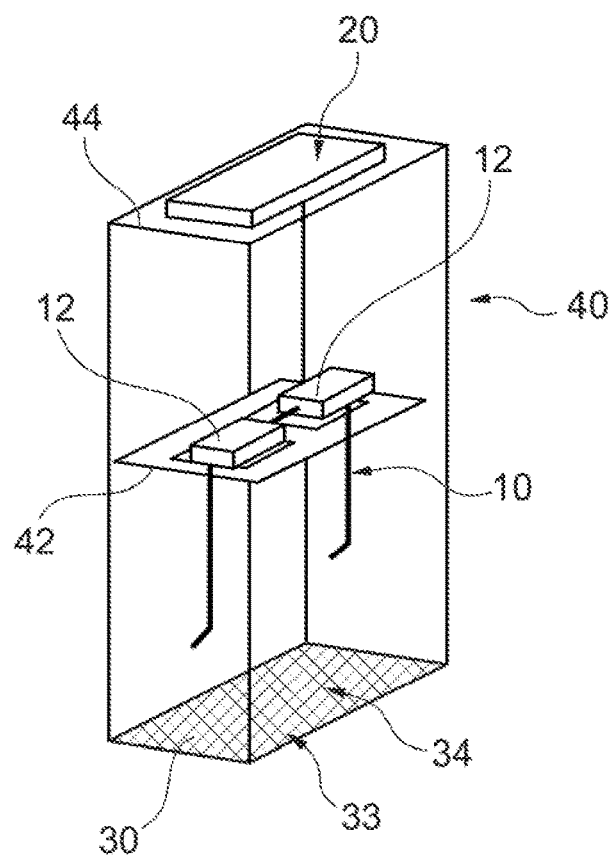
FIG. 4 is a schematic representation of a device according to the invention.

As illustrated on FIG. 4, the invention further relates to a device 40 for determining at least a parameter of an optical equipment 10 comprising a pair of optical lenses 12 mounted on a spectacle frame.

The device may comprise a receiving element 42 and an acquisition receiving element 44.

The receiving element 42 is configured to physically receive an optical equipment 10 in at least a first predetermined position. The device according to the invention may comprise a plurality of receiving elements 42 or the receiving element 42 may be moved between known positions.

The acquisition receiving element 44 is configured to physically receive a portable electronic device 20 having an image acquisition module in at least a second predetermined position relative to the optical equipment 10 received by the receiving element so as to acquire an image of a distant element 33 seen through at least part of the optical lenses 12 of the optical equipment 10 received by the receiving element 42.

Advantageously, the use of such a device helps assuring an accurate and controlled position and orientation between the acquisition module and the optical equipment.

As further illustrated on FIG. 4, the device according to the invention may further comprise a predetermined pattern 34 to be used as said distant element 33.

Advantageously, having a predetermined pattern 34 in the device 40 of the invention provides more controlled conditions for determining parameters of the optical equipment 10. Preferably, the predetermined pattern 34 is in a third predetermined position relative to the first and second predetermined positions.

The device of the invention may also comprise a transparent side so as to allow using a distant element 33 of the environment as distant element or a printed pattern.

The device according to the invention may comprise means for determining the position of the distant element 33 relative to the first and/or second predetermined positions.

Figure 9:
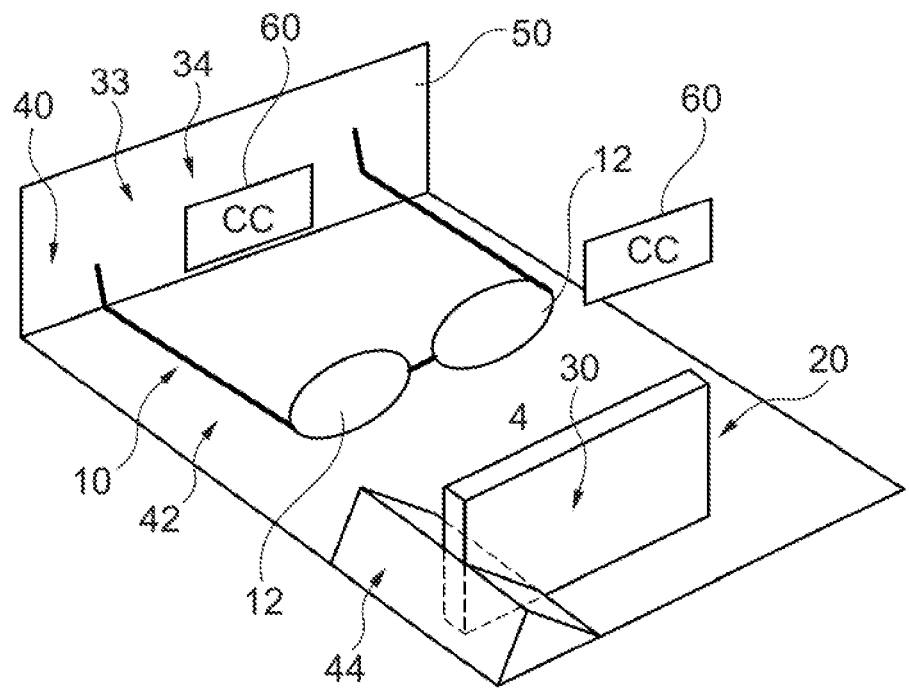

As illustrated on FIG. 9, the device according to the invention may further comprising a light reflecting element configured to reflect a pattern 34 displayed on a screen of the portable electronic device 20 so as to provide a distant element 33 to be acquired by the portable electronic device 20 through at least part of the optical lenses 12 of the optical equipment 10 received by the receiving element. This reflecting element may be in the form of a standard mirror 50, and the user may place the equipment 10 in contact with the mirror 50. The display is then used to display the pattern 34, and the camera 22 (at the same side than the display) is used to take an image of the pattern 34 seen through the equipment 10. In this case, the distance d1 and d2 are the same, and the pattern 34 will be deformed by the lens twice, since a reflection occurs. The power measurement will be twice the real lens power.

The device 40 according to the invention may be provided to the person as a template 35, For example, the person may download a template to be printed.

The template 35 may be specifically adapted to the type of portable electronic device 20 and may be directly printable on one or a plurality of standard sheets.

FIG. 5 is an example of template 35 comprising reference to help the person position the portable electronic device 20 and the optical equipment 10.

The template 35 illustrated on FIG. 5 further comprises a known pattern 39 that may be used to determine the relative position of the optical lenses 12 with the portable electronic device 20 and the pattern 34.

In a first step, the person does not touch anything and just put his smartphone at the location 36 indicated on the template, taking care to place the rear camera at the location 37 indicated on the template. The person also places the front of equipment 10 at a known location 38 indicated on the template, and the pattern 34 at a known location 39. This pattern 34 can be a part of the template 35 itself, for example a part of a sheet of paper having square grid and 90° folded at the pattern location 39.

As an alternative, the equipment location 38 may not be indicated, and the branches of the frame may be measured first by taking a photo or by using the known size of the pattern 39, and then the end of the 2 branches may be in contact with the pattern 39 so that the position of the front of the equipment 10 is known.

Another alternative consists of delivering a template composed of 3 parts:
  a first part similar to the template described in FIG. 5 and being the base of the device
  a second part which can be clicked to the side of the base near the frame position and which deliver the pattern
  a third part which can be clicked to the opposite side of the base near and which receives the electronic device.

This first part is obtained by folding a paper according to specific instructions to ensure the best maintaining of the device at a known distance of the pattern. This part can be defined specifically for each type of electronic device.

Other combination of alternatives than the examples described previously are possible.

For example, the distances may be determined thanks to images of a known object 60, such as a credit card, placed in the frame and pattern plans, and thanks to the knowledge of camera focal value as illustrated on FIG. 9.

In a second step, the frame and the smartphone being well positioned, images are taken of the grid of the pattern 34 deformed through the optical lenses 12. The length of the branches of the frame (previously measured) being known and the smartphone position being fixed, the distance d1 and d2 are known without the need to know the characteristics of the camera of the smartphone.

Images of maximum stability are selected (optimal sharpness) to compensate the tremor of the person.

The image acquisition can be controlled completely independently by an automatic adjustment of focus and by using a timer to trigger the photo-taking without undergoing any shaking of the user.

In a third step the size of the grid seen through the optical lenses 12 are compared to the known size of the grid to determine the magnification G (x, y) at different points of the optical lenses 12.

Optical features of the optical lenses 12 may then be determined.

The device 40 may of course be adapted to the different type of portable electronic devices 20 and/or spectacle frames.

The invention also relates to a method for ordering a new optical equipment for a user of a first optical equipment.

As illustrated on FIG. 6, the ordering method of the invention may comprise:
  an optical equipment positioning step S10, during which the first optical equipment comprising a first pair of optical lenses mounted on a first spectacle frame is positioned in a first position, a portable electronic device positioning step 11, during which a portable electronic device comprising an image acquisition module is positioned in a second position so as to acquire an image of a distant element seen through at least part of the optical lenses of the first optical equipment in the first position, an acquisition step S12, during which at least one image of the distant element seen through at least part of the optical lenses of the first optical equipment is acquired, a position adjustment step S13, during which the relative position of the portable electronic device and the first optical equipment is adjusted based on an identification of at least part of the optical equipment and/or the portable electronic device, an ordering step S15, during which an order request for a new optical equipment is sent to a distant entity, the order request comprising the at least one image acquired by the portable electronic device and new optical equipment identification data.

The ordering method of the invention may further comprise a parameter determining step S14, during which at least one optical parameter of the optical equipment is determined based on the image of a distant element seen through at least part of the optical lenses of the optical equipment in the first position.

So as to increase the accrual of the measurements and the overall satisfaction of the user, the ordering method may comprise a device providing step during which a device according to the invention is provided to position the first optical equipment and a portable electronic device.

As illustrated on FIG. 7, the invention further relates to a method for providing optical equipment for a person. The providing method comprises:

an order receiving step S20 during which an order request generated by a method according to the invention and comprising at least an image of a predetermined element seen through at least part of the optical lenses of the first optical equipment of the person is received, a parameter determining step S21 during which at least one optical parameter of the optical equipment is determined based on the at least one received image, an optical equipment providing step S22 during which a new optical equipment is provided to the person based on the at least one optical parameter determined during the parameter deter mining step.

The invention has been described above with the aid of embodiments without limitation of the general inventive concept; in particular the mounted sensing device is not limited to a head mounted device.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for determining a parameter of optical equipment, the method comprising:

acquiring, with an image acquisition module, an image of a pattern that is displayed on a screen of a portable electronic device and transmitted through at least part of optical lenses of the optical equipment, the image being reflected by a light reflecting element back through at least part of the optical lenses to the image acquisition module; and determining at least one optical parameter of the optical equipment based on the image of the pattern, wherein the optical equipment is positioned in a first position, the portable electronic device is positioned in a second position, and the light reflecting element is positioned and configured to reflect the pattern.

2. The method according to claim 1, wherein the image acquired by the image acquisition module is from the pattern deformed twice by the optical equipment.

3. The method according to claim 1, wherein the at least one optical parameter is determined by comparing the pattern shown on the screen of the portable device with the image of the pattern that is deformed twice by the optical equipment.

4. The method according to claim 1, where the optical equipment includes a pair of optical lenses mounted on a spectacle frame.

5. The method according to claim 4, wherein the light reflecting element is in a form of a mirror, and the optical equipment is positioned in contact with the mirror.

6. The method according to claim 5, wherein the optical equipment is positioned so that a pair of lenses is in contact with the mirror or a pair of temples is in contact with the mirror.

7. The method according to claim 1, wherein the portable electronic device is selected from a list consisting of a smartphone, a personal digital assistant and a tablet computer.

8. The method according to claim 1, further comprising determining distance and relative orientation between the first position of the optical equipment and the second position of the portable electronic device.

9. The method according to claim 8, wherein the distance and relative orientation of a first and second distance are determined using at least a measuring capability of the portable electronic device.

10. An apparatus for determining a parameter of optical equipment, comprising:

means for acquiring an image of a pattern that is displayed on a screen of a portable electronic device and transmitted through at least part of optical lenses of the optical equipment, the image being reflected by a light reflecting element back through at least part of the optical lenses; and means for determining at least one optical parameter of the optical equipment based on the image of the pattern, wherein the optical equipment is positioned in a first position, the portable electronic device is positioned in a second position, the light reflecting element is positioned and configured to reflect the pattern.

11. The apparatus according to claim 10, wherein the portable electronic device includes measuring means for determining a distance and relative orientation of a first and second distance.

12. The apparatus according to claim 10, further comprising a position help module on the portable electronic device that provides a feedback to a user on how to position the optical equipment.

13. A method for ordering new optical equipment for a user of first optical equipment, the method comprising:

positioning the first optical equipment including a first pair of optical lenses mounted on a first spectacle frame in a first position, positioning a portable electronic device comprising an image acquisition module in a second position, acquiring, with an image acquisition module, an image of a pattern that is displayed on a screen of the portable electronic device and transmitted through at least part of optical lenses of the first optical equipment, the image being reflected by a light reflecting element back through at least part of the optical lenses to the image acquisition module;

determining at least one optical parameter of the first optical equipment based on the image of the pattern; and sending an order request for the new optical equipment to a distant entity, the order request comprising the at least one parameter.

14. The method for providing optical equipment for a person, the method comprising:

receiving an order request generated by the method according to claim 13, providing the new optical equipment to the person based on the at least one optical parameter determined during the determining of the at least one optical parameter.

15. A non-transitory computer readable medium for storing a program causing a computer to execute a process comprising:

acquiring, with an image acquisition module, an image of a pattern that is displayed on a screen of a portable electronic device and transmitted through at least part of optical lenses of optical equipment, the image being reflected by a light reflecting element back through at least part of the optical lenses to the image acquisition module; and determining at least one optical parameter of the optical equipment based on the image of the pattern, wherein the optical equipment is positioned in a first position, the portable electronic device is positioned in a second position, and the light reflecting element is positioned and configured to reflect the pattern.

16. A non-transitory computer readable medium for storing a program causing a computer to execute a process for ordering new optical equipment for a user of a first optical equipment, the process comprising:

positioning in a first position first optical equipment comprising a first pair of optical lenses mounted on a first spectacle frame;

positioning in a second position a portable electronic device comprising an image acquisition module;

acquiring, with an image acquisition module, an image of a pattern that is displayed on a screen of the portable electronic device and transmitted through at least part of optical lenses of the first optical equipment, the image being reflected by a light reflecting element back through at least part of the optical lenses to the image acquisition module;

determining at least one optical parameter of the first optical equipment based on the image of the pattern; and sending an order request for the new optical equipment to a distant entity, the order request comprising the at least one parameter.

* * * * *